United States Patent
Devlin et al.

(12) 
(10) Patent No.: US 6,421,749 B1
(45) Date of Patent: Jul. 16, 2002

(54) PLAYBACK AND MONITORING OF COMPRESSED BITSTREAMS

(75) Inventors: Bruce Fairbain Devlin, Chiddingfold; Michael James Knee, Petersfield, both of (GB)

(73) Assignee: Snell & Wilcox Limited, Middlesex (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,097

(22) PCT Filed: Apr. 14, 1997

(86) PCT No.: PCT/GB97/01032
§ 371 (c)(1),
(2), (4) Date: Feb. 22, 1999

(87) PCT Pub. No.: WO97/39590
PCT Pub. Date: Oct. 23, 1997

(30) Foreign Application Priority Data

Apr. 12, 1996 (GB) .............................. 9607591

(51) Int. Cl.⁷ .............................. G06F 13/14
(52) U.S. Cl. .................. 710/65; 382/232; 382/307; 700/94
(58) Field of Search ................. 382/307, 232; 364/715.02; 370/85.5; 710/65, 52; 700/94

(56) References Cited

U.S. PATENT DOCUMENTS

| | | | | |
|---|---|---|---|---|
| 4,633,490 A | * | 12/1986 | Goertzel et al. | 375/240 |
| 5,623,423 A | * | 4/1997 | Lipovski | 708/203 |
| 5,666,460 A | * | 9/1997 | Ohta et al. | 386/82 |
| 5,699,460 A | * | 12/1997 | Kopet et al. | 382/307 |
| 5,706,002 A | * | 1/1998 | Meehan et al. | 341/67 |
| 5,731,839 A | * | 3/1998 | Panaro | 348/416 |
| 5,784,107 A | * | 7/1998 | Takahashi | 348/412 |
| 5,798,788 A | * | 8/1998 | Meehan et al. | 348/180 |
| 5,835,146 A | * | 11/1998 | Stone | 348/416 |
| 6,138,051 A | * | 10/2000 | Dieterich | 709/94 |

FOREIGN PATENT DOCUMENTS

| | | |
|---|---|---|
| EP | 0520250 A2 | 12/1992 |
| WO | WO94/25935 | 11/1994 |

* cited by examiner

*Primary Examiner*—Jeffrey Gaffin
*Assistant Examiner*—Ahdelmaniem Elamin
(74) *Attorney, Agent, or Firm*—Venable; Robert Kinberg

(57) ABSTRACT

An apparatus for testing a compression decoder, includes a compression encoder having a picture input for receiving picture material and a coding decision input for receiving coding decisions from a set of legal coding decisions, where the compression encoder is adapted to encode picture material utilising the received coding decisions, a generator for generating random coding decisions from the legal set, and a playback device for communicating encoded picture material from the encoder to a decoder under test.

10 Claims, 4 Drawing Sheets

PLAYBACK AND MONITORING OF COMPRESSED BITSTREAMS

BACKGROUND OF THE INVENTION

This invention relates to apparatus and processes for the playback and monitoring of compressed bitstreams, for example MPEG1 or MPEG2 bitstreams.

A principal application of the present invention lies in the testing of MPEG or similar decoders for compliance with MPEG standards or indeed other standards or set levels of decoder performance. Forms of this invention will also find application in the testing or other investigation of MPEG and other compression encoders.

SUMMARY OF THE INVENTION

In one aspect, the object of the present invention lies in the provision of improved apparatus for the handling of compressed bitstreams, which can deal elegantly and flexibly with the demands likely to be placed on bitstream handling by a wide range of test and investigative procedures.

Accordingly, the present invention consists in one aspect in apparatus for the playback and monitoring of bit-rate reduced bitstreams, comprising buffer means for communication with bitstream storage; an interface; and a bi-directional processing array connected between the buffer means and the interface, the processing array being configurable to modify and process data flowing in a first direction in a plurality of playback modes and to analyse and process data flowing in a second direction in a plurality of monitoring modes.

In a further aspect, the present invention consists in apparatus for testing a compression decoder, comprising a store for holding compressed test data together with synthesis data defining a test picture to result from time decoding of the compressed test data; playback means for communicating the compressed test data to a decoder under test and means for comparing a decoded picture with a test picture synthesized from said synthesis data.

Preferably, the stored compressed test data includes synchronisation events for synchronisation of the decoded and test pictures.

Suitably, the stored compressed test data includes picture elements for registration of the decoded and test pictures in terms of position, level and the like.

Advantageously, a plurality of compressed test data streams correspond respectively with discrete regions of a picture enabling simultaneous execution of a plurality of tests.

BRIEF DESCRIPTION OF THE DRAWINGS

The invention will now be described by way of example, with reference to the accompanying drawings, in which.

DETAILED DESCRIPTION OF THE INVENTION

It will be possible to conduct certain tests utilising part only of a picture, possibly down to macroblock level. In this arrangement a number of tests can be conducted simultaneously.

The ability to perform auto-testing, whether picture-by-picture or with a number of simultaneous tests as just mentioned, will offer very substantial time economies in test procedures. Where time is restricted by production cost factors, this invention should enable very much more thorough testing than would otherwise be possible.

Although attention has been focused on test and measurement, whether for development, quality control or commercial reasons, the present invention will find application in other areas where flexible and controlled playback or analysis of compressed bitstreams is required. Just two examples are the compressed analogues of video frame stores and logo generators.

Figure 1:
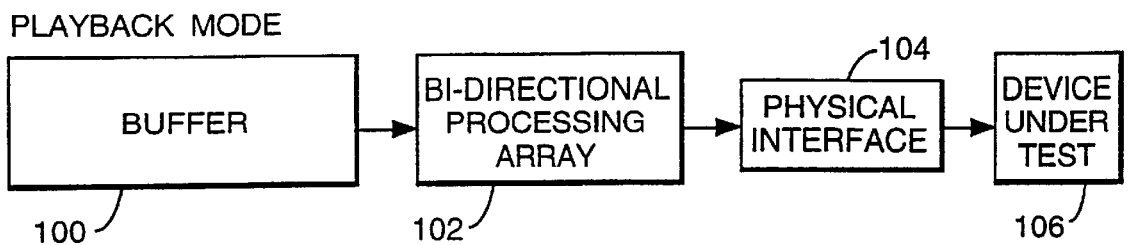
FIG. 1 illustrates in block diagram form apparatus according to the present invention in a playback mode.

The architecture of one embodiment of the present invention is essentially a bi-directional memory/processing array which may be partitioned to provide purely playback, purely record or mixed playback/record functions for MPEG bitstreams. A block diagram of the architecture is shown in FIG. 1 in playback mode.

In playback mode, the memory or buffer 100 acts as a source of information which plays into the processing array 102. This modifies and processes the data according to the playback modes selected. The data is passed onto the physical interface 104 and then onto the Device Under Test (DUT) 106.

Figure 2:
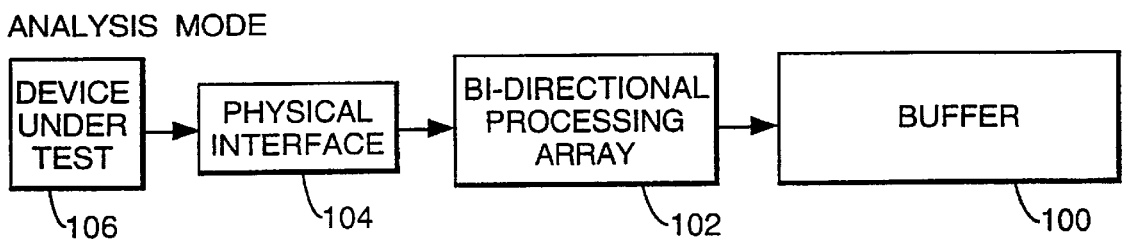
FIG. 2 is a diagram similar to FIG. 1 illustrating a monitoring or analysis mode.

In Analysis mode, shown for example in FIG. 2, the same circuits are used, but the direction of each of the elements is reversed. This allows common circuits to be used in both playback and analysis processing. The Device Under Test 106 produces data which is accepted by the unit on its physical interface 104. The bi-directional processing array 102 performs any data modification functions required before the data is finally stored in the buffer 100.

Figure 3:
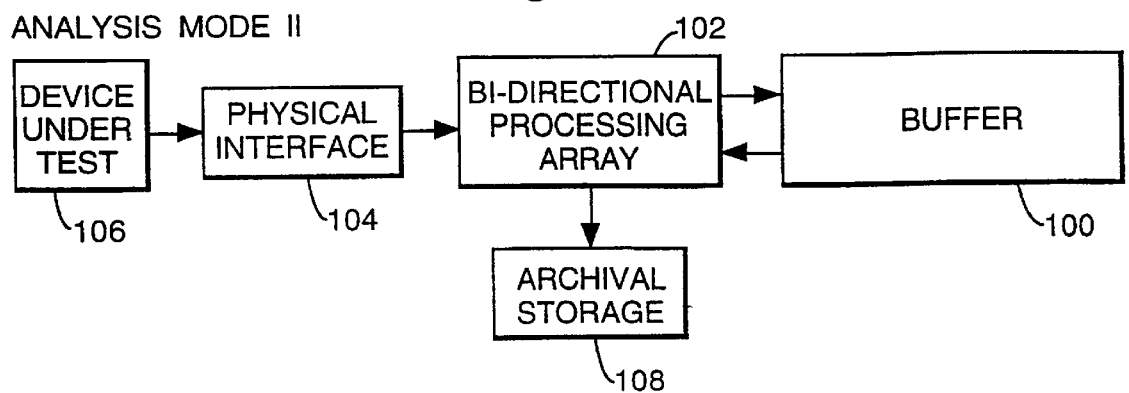
FIG. 3 is a diagram again similar to FIG. 1, illustrating an alternative monitoring or analysis mode.

Both these modes may be combined to provide a further analysis mode illustrated in FIG. 3, in which the data is temporarily stored in the buffer 100 before being re-processed in the array 102 for real time archival to some archival storage medium 108, such as hard disk or tape.

Figure 4:
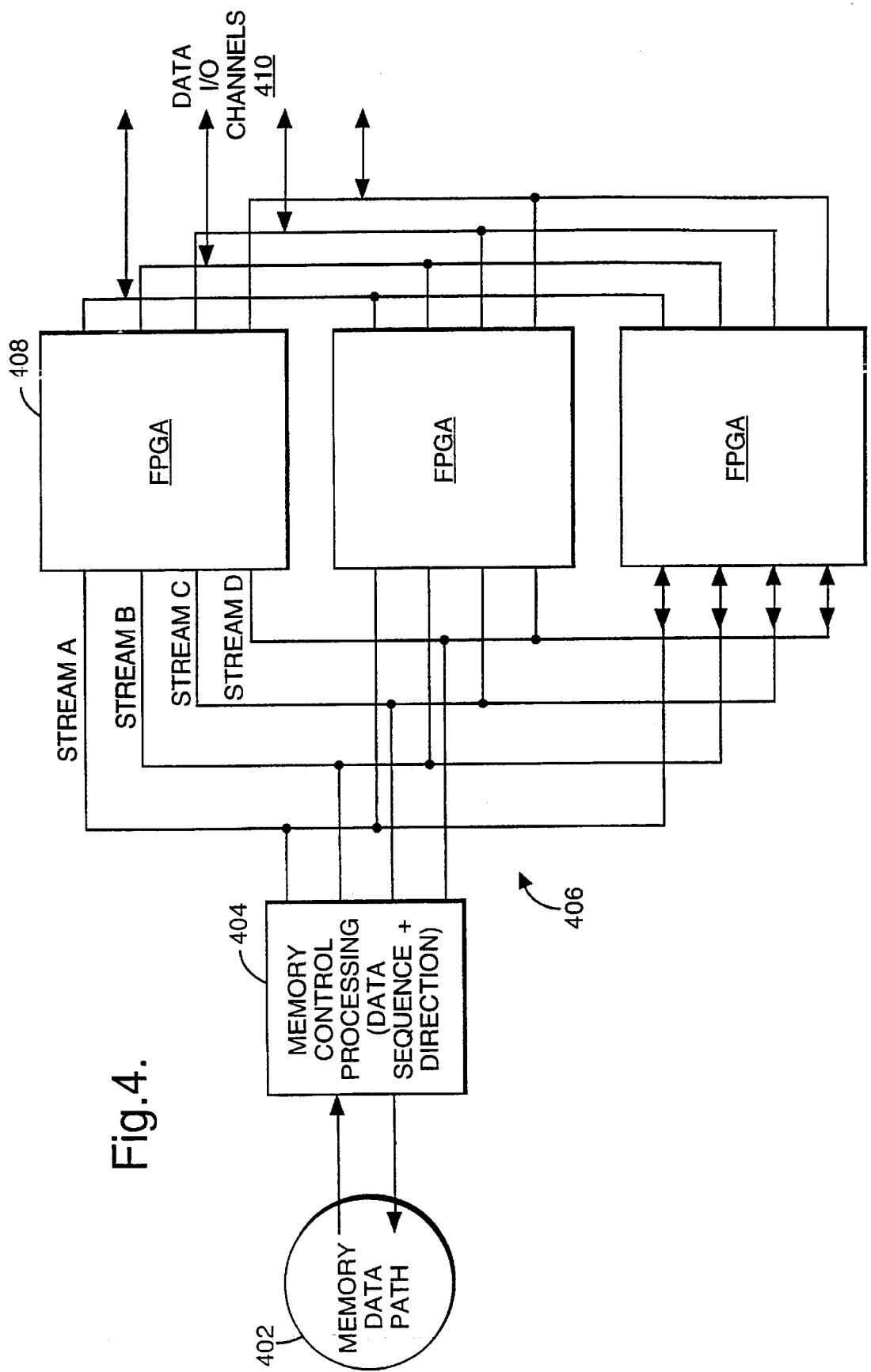
FIG. 4 is a more detailed circuit diagram of an embodiment of the present invention.

A circuit representing one form of the above architecture is shown in FIG. 4.

A memory data path 402 communicates with a memory control processing block 404 which controls the data sequence and direction. Outputs from block 404—and in this example there are four outputs—connect with respective bi-directional busses shown generally at 406. An array of processing devices, in this case three field programmable gate arrays 408, are connected between these bi-directional busses 406 and appropriate data input/output channels shown at 410. The FPGA's typically comprise in aggregate 10K gates. They are re-configured depending upon the direction of data flow and depending upon the mode selected.

This arrangement is extremely powerful and enables, for example, the processing array to conduct a wide variety of monitoring and analysis operations on bitstreams in real time. Similarly data manipulation can be handled in a variety of record modes.

An example will now be described of a specific analysis.

MPEG 2 data streams are split into several layers. The Elementary Stream layer is the one which may contain the data for video or audio that is destined for a decoder. The Elementary Stream data contains all the information that is required to reconstruct the video or audio signal, but is not ideally suited for transmission on a channel.

The MPEG2 Transport Stream encapsulates elementary streams so that they may be transmitted on some transmission channel. The transport stream is made up of packets, each of which comprise 188 bytes of a single elementary stream. Packets from different elementary streams are then time division multiplexed to form a single transport stream. This transport stream will typically be at a fixed data rate for use on a telecommunications channel of some kind.

Not all elementary streams can use the 188 bytes of the packet that they have been allocated. This may be due to a low data rate, or the "bursty" nature of the stream. This means that the Transport Stream multiplexer must insert "stuffing" or NULL data to fill up the unused part of the packet. This leads to inefficiency in the transport stream, as valuable bandwidth is being used to send NULL data.

The stuffing meter in this embodiment of the invention is an efficiency meter which monitors the stuffing. As bytes enter the machine, they are first checked to see if they are for the elementary stream of interest. If so, two counts are kept:

$$TSbytes = \sum_{t=0}^{t=T} All\_bytes\_s\_Transport\_Stream\_for\_this\_Elementary\_Stream$$

$$ESbytes = \sum_{t=0}^{t=T} All\_Elementary\_Stream\_bytes\_excluding\_stuffing$$

(where T is some arbitrary time value). ESbytes is a count showing the number of actual data bytes in the stream, excluding all transport stream headers and stuffing bite. This value could well be 0!

The stuffing meter shows efficiency η=0. 100% calculated:

$$\eta = \frac{ESbytes}{TSbytes} \times 100$$

In many applications, there will be a need for analysis of byte allocation within a transport stream or within a multiplex and particularly a statistical multiplex, for commercial purposes.

As well as a wide variety of different real time monitoring and analysis operations, it is envisaged that specific monitored events will trigger recording for a more detailed off-line analysis.

In one form, this invention strives to provide improved for conformance testing of decoders.

The MPEG standards define a bitstream and how it should be interpreted by a decoder to produce a television signal. The standards also specify "constrained parameters" (in the case of MPEG-1) or "levels and profiles" (MPEG-2). These define degrees of complexity or processing rate at which decoders are expected to operate correctly. A decoder is said to be conformant at a certain level and profile if it can correctly decode any legal bitstream at that level and profile.

The problem considered here is that of testing a decoder to prove beyond reasonable doubt that it is conformant. Within a given level and profile, there are a multitude of parameters that can vary in the bitstream and that can affect the performance of the decoder. This makes the testing problem far from trivial.

Two methods have been suggested for testing decoders for conformance. Both of them require some kind of playout hardware to play a Transport Stream (TS), Program Stream (PS), Packetized Elementary Stream (PES) or Elementary Stream (ES) into the decoder to be tested. The difference between the two methods lies in the set of bitstreams used.

The first method is simply to use bitstreams derived by coding normal picture material, either in a software or a hardware encoder. Typically, the decoder would be connected to an existing MPEG broadcast service and a visual check made for faults. This method of testing decoders suffers from two major disadvantages. Typical picture material, while providing a useful first check that a decoder is working, is unlikely to exercise coding parameters sufficiently unless the test is operated over a very long period of time. Secondly, such a test would only involve one or a few different encoders and there is no guarantee that any particular encoder would exercise the coding parameters extensively, even on demanding picture material. This may not be a problem if the decoder under test is intended for use in a closed system with a limited range of coders, but such an approach would be ill-advised as the use of the MPEG standards increases. It may also make it impossible to upgrade coders in the future.

A second method of testing decoders is to play specially generated bitsteams into them. The above described apparatus in playback mode is especially well suited to this purpose. A typical set of bitstreams would contain material that exercises each coding parameter in turn. For example, one bitstream would make use of the maximum allowable motion vector range, while another might be designed to fill the decoder buffer to a maximum value. A refinement to this method consists in following several frames of extreme parameters (which might not produce visible effects on the screen) which a sequence of "blank" (zero prediction-error) frames. Any problems created at the beginning of the sequence would propagate into the blank part of the sequence and would be more likely to make themselves visible.

This method overcomes the problems of the first method to some extent. The test has a limited and reasonable length and can exercise all the coding parameters. However, it still has the disadvantage that the coding parameters are only exercised one at a time.

It is an object of a further aspect of the present invention to provide for auto-testing, by which a relatively large-number of tests can be performed quickly and accurately.

MPEG video decoders can largely be categorised into two categories: professional and consumer. An auto-test strategy should preferably be able to cope with both categories of equipment, where one has been designed for performance and the other has been designed to give a limited performance for a much lower price. The auto-test method according to one aspect of the present invention takes into account some of the limitations of consumer equipment and to exclude these from the testing of the core MPEG decoder.

The overall strategy in this test method is to playback a known MPEG video data stream into the Decoder Under Test (DUT) and then to take measurements of the output video so that the performance of the MPEG decoder can be assessed. The test is intended to show whether or not a decoder incorrectly follows the MPEG syntax and is not intended to measure subjective picture quality.

Figure 5:
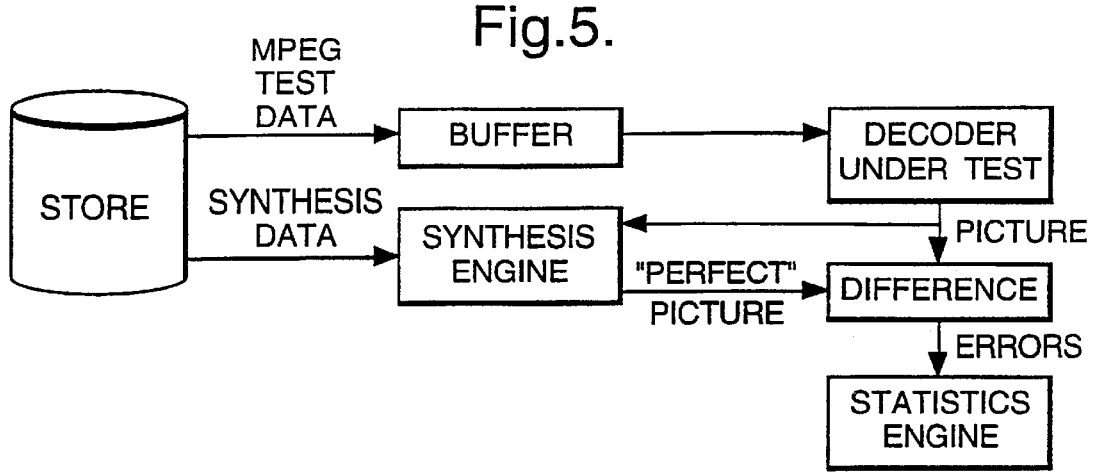
FIG. 5 is a block diagram of a further embodiment of the present invention, affording auto-testing.

The method is shown below in block form in FIG. 5.

MPEG bitstreams will be created which generate easily synthesisable video outputs such as mid-grey fields, checker boards or luminance ramps. These are then played into the DUT which produces the video picture. This video picture may contain non-MPEG impairments such as:

incorrect luminance levels, incorrect video gain, digital to analogue conversion noise incorrect picture position These in themselves may be important to the device under test, but are considered here to be impairments which should be ignored.

The measurement technique is as follows:

1. The MPEG bitstream is played from the store to the device under test. This bitstream contains patches of constant luminance and colour data which may be easily locate (e.g. a horizontal or vertical stripe). The bitstream on success should show an easily synthesisable picture e.g. a mid grey field (with the patches previously mentioned).
2. The decoder produces pictures from the MPEG bitstream which are fed into the picture difference unit.
3. The pictures are also fed to the synthesis engine which maintains temporal synchronisation through the use of synchronisation events in the stream (e.g. a sequence of black and white frames)
4. The picture synthesiser uses synthesis information stored with the bitstream to re-create the "perfect" decoded picture which is fed into the picture difference unit.
5. The picture difference is then statistically analysed to detect failure of the decoder. It is assumed that the bitstream has been coded so that failure of the test results in less than perfect reconstruction of the synthesisable picture (e.g. instead of a mid grey field, the picture will have black/white or coloured blotches on it or alternatively a black & white "chess board" will have grey smeared edges to the transitions on failure).

Analysis of the difference is performed so as to ignore deficiencies of consumer grade equipment:

In a "dark patch" area ("perfect" luminance level $Y_{dark}$), mean luminance is measured over several pixels in the decoded picture $Y_{dark}$ In a "light patch" area("perfect" luminance level $Y_{light}$), mean luminance is measured over several pixels in the decoded picture $Y_{light}$ Errors in the luminance level (y) in the decoded picture may now be eliminated by using simple interpolation between these values. This may be extended to correct for linearity problems in the consumer DAC by using a luminance ramp and using a curve fitting technique instead of linear interpolation. The same technique can be used to colour correct the R, G & B channels by having R, G & B "patches".

Picture position errors are assumed not to be gross (i.e. less than 30–60 pixels). These errors are eliminated by using a video test pattern which is not subject to gross positional changes e.g. a mid-grey field or a luminance ramp.

Alternatively, the statistics are adjusted to use relative picture positions rather than absolute. e.g. a black & white chess board can be used and the nature of each black to white transition is inspected rather than the position on the screen of that transition.

The final go/no go gauge must be independent of consumer DAC noise. This will manifest itself as small differences in the luminance/chrominance values. This is removed by ensuring that MPEG decoder failure produces extreme picture distortion. If the mean pixel difference is calculated along with the standard deviation of the pixel difference, a threshold can be set to classify small errors as "noise" and large errors as "failure".

Failure can be shown in real time, by taking the video picture from the decoder and replacing the chrominance information with a number proportional to the absolute value of the difference. Changing the threshold value will remove more or less of the colour information and will allow the threshold to be visually set so that failures are shown, but DAC noise is not.

Auto-testing provides certain advantages over the prior testing approach. In a further aspect, there is provided by the present invention an alternative approach which essentially makes use of a random sequence to test the decoder. The use of such a random sequence ensures (in a statistically significant sense) a full test of the decoder. It is generally not possible to feed the decoder with a random bitstream; this would almost certainly be meaningless. Likewise, it would not be possible to make a suitable bitstream by feeding an encoder with white noise; this would simply force very coarse quantization in the encoder, severely limiting the variation in coding parameters. Instead, the invention makes use of the Information Bus and a "dumb encoder" both of which are described in WO-A-95/35628 to which reference is directed.

A particular example of the physical format of the information bus will now be described. In essence, the information bus signal is a digital signal that accompanies a picture signal or a partially encoded or decoded picture signal. It contains two parts which may be time multiplexed together, though other means of combining the two parts are not excluded. The first part (which may be regarded as the core information) consists of all the side information that controls the compression coding or decoding, typically in a form from which individual pieces of information can easily be extracted. In practice, this means that the core information is carried in a fixed-length coding format, in contrast to coded bitstream format which may involve variable length coding. The core information consists of, predominantly, motion vectors with additional information such as the number of the coding mode currently in use and the quantisation step size. The second part consists of additional information which is related to the control of the coding or decoding process but which does not form part of the coded bitstream. It includes, for example, statistical information such as the number of bits being used for coding luminance and chrominance blocks and for coding motion vectors. It will usually also include information concerning errors together with instructions for use in error concealment. Candidate motion vectors or recommended quantizer step sizes may also be included.

In the case of MPEG-2, the information bus carries information which varies at different rates: sequence, GOP, picture, slice and macroblock. It is also intended to be kept in synchronism with the picture signal, which for most of its life within the code may be in a macroblock scanning format with a picture blanking interval. For this reason, one particular form of the information bus is arranged in a two level structure, with sequence, GOP and picture rate information carried in the picture blanking interval and slice and macroblock rate information carried in a macroblock based structure that is co-timed with the picture signal.

The information rate required for the information bus necessitates a parallel signal format, if the clock rate used for the picture signal is to be retained. In one particular embodiment, a four bit wide signal is used internally. For external use, this signal is converted to a format compatible with the luminance component of a CCIR Rec.656 signal, so that it pass between existing devices. In both cases, macroblock and picture addressing information is included in the format so that synchronism with the picture signal can easily be verified.

The information bus will in this example include at least two timing signals: a picture rate signal and a macroblock signal. These signals are used, as will be described, in information interpreters and inserters which decode, update or insert selected pieces of information within the information bus.

Figure 6:
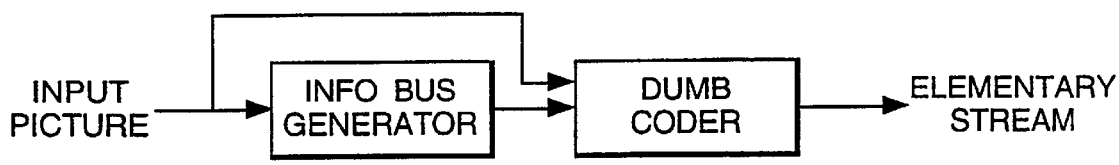
FIGS. 6, 7, 8 and 9 are block diagrams relating to a further embodiment of the invention.

Dealing first with picture rate information, this—as mentioned—will include "repeats" of information changing at the GOP or sequence level. To facilitate use by devices which require only "true" picture rate information, the picture rate information may usefully be provided in two bursts, the first of which contains all the GOP and sequence information and can be ignored by devices if they choose. The first burst of the picture rate information might therefore include:

Burst I
- Global Picture Rate Information
- New sequence and GOP header flags
- MPEG1/MPEG2 flag
- Decoded or "raw" motion vectors flag
- Sequence Rate Information
- Horizontal and vertical sizes
- Aspect ratio
- Frame rate
- Colour information
- GOP Rate Information
- Time code The second burst will include picture rate information such as:

Burst II
- Core Information
- Time reference
- Coding type
- Horizontal and vertical display offsets
- Quantiser matrix information
- Non-core Information
- Motion vector source
- Cut detection
- Numbers of I, P and B frames remaining in GOP
- Film phase (or 3:2 pulldown) detection
- Field or frame like index
- Pan vector identification
- Letterbox detection Turning now to macro rate information, this can be broken down into address information, core information (which may include slice rate information) and derived or non-core information. Examples are:

- Address Information
- Picture address
- Stripe number
- Position within stripe
- Core Information
- Macroblock type
- Motion type (field/frame)
- Motion vector types
- Motion vectors
- Derived Information
- Macroblock scan mode
- Error concealment flag
- Causes for concealment
- Numbers of bits used for:
  - Motion vectors
  - Other overheads
  - Luminance
  - Chrominance
- Candidate motion vectors A coder based on the Information Bus works by building up the Information Bus in successive processing blocks such as the motion estimator, half-pixel refiner, mode selector and adaptive quantizer. The picture signal and Information Bus are then passed to the Dumb Coder which performs the video encoding by applying data it receives on the Information Bus. The dumb coder makes no decisions of its own. FIG. 6 is a simplified block diagram of such a coder.

Figure 7:
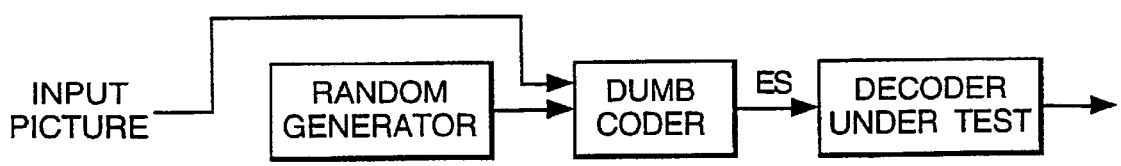

The basis of this aspect of the present invention is to generate random or pseudorandom information in the Information Bus and to use this information to control the dumb coder, as shown in FIG. 7. Additionally, the picture input may also consist of random information. This ensures, at least in a statistical sense, that the extremes of all the coding parameters are explored in various unpredictable combinations.

In order to exploit this basic invention, three further questions should preferably be addressed. These are:
- the possible generation of illegal combinations of coding parameters;
- how to control the bit rate of the output bitstream without simply setting a very coarse quantizer; and
- how to detect decoder violations and find their cause.

Figure 8:
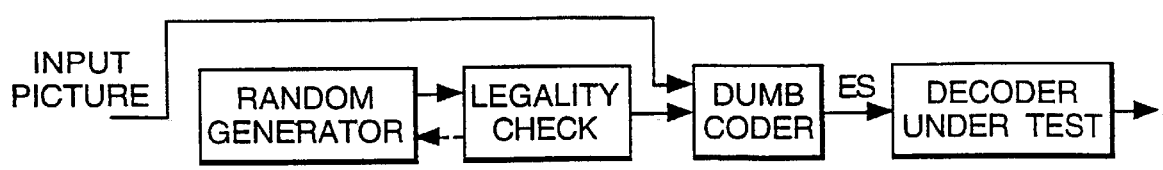

First addressed is the question of the possible generation of illegal coding parameters. The suggested solution to this is to run a check as the parameters are generated, replacing any illegal sets with newly or previously generated legal ones, as shown in FIG. 8. It may also be possible to use some intelligent processing in the parameter generation process to minimize the need for such corrections.

Second is the question of controlling the output bit rate. The following solution is proposed:

1. Choose a typical picture sequence, rather than a random sequence, as the picture input
2. Measure the average bit rate $B_r$ that would be produced by this sequence with random coding parameters (including random quantizer step sizes). This is likely to be very high.
3. Measure the bit rate $B_g$ that would be produced by this sequence using a "good" or reference coding algorithm with a typical quantizer step size.
4. Choose a target average bit rate $B_t$ for the test which is higher than $B_g$.
5. Calculate the proportion P of randomly coded pictures and macroblocks that would produce an average bit rate of $B_t$ in a sequence that is otherwise coded using the reference algorithm. At a first approximation this might be given by $P=(B_t-B_g)/(B_r-B_g)$, though this may prove to be an overestimate because of the effect of random coding parameters on the quality of picture information used for predictions by the reference algorithm.

6. Code the sequence using "random" coding parameters for a proportion P of macroblocks and pictures, choosing at random the macroblocks and pictures to be thus coded. The remaining macroblocks and pictures are coded using the reference coding algorithm.

7. Apply rate control to either the quantizer or to the proportion P in order to meet the target bit rate $B_t$. If possible, the target buffer occupancy for the rate control should also be varied randomly.

A more complex method might be used to include a proportion of random picture material as well as coding parameters. The additional problem here is that the average bit rate would increase greatly over the estimate given above because white noise would appear in the reference pictures used for prediction of information intended to be coded by the reference algorithm.

Figure 9:
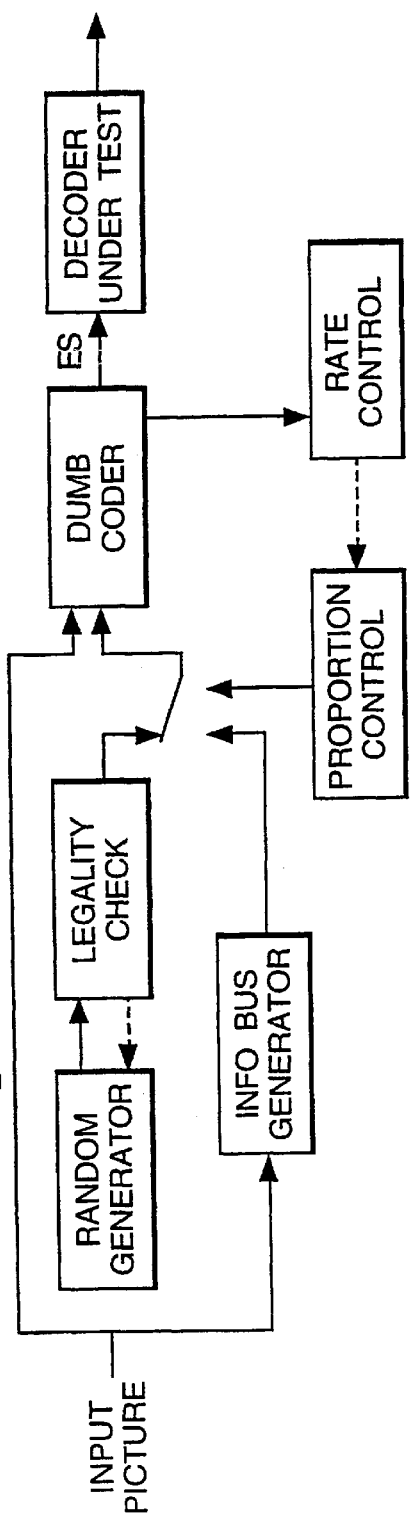

FIG. 9 illustrates how the above method of bit rate control could be incorporated into the system.

The third question is that of detecting decoder violations and finding their cause. Even if a typical picture sequence has been used as described above, it is unlikely that a visual inspection of the decoded picture would have any meaning. Instead, the following procedure is proposed:

1. The bitstream is fed into a known reference decoder in parallel with the decoder under test and the difference between the two output picture signals monitored.

2. In the absence of a reference decoder, the local decoder output of the dumb coder can be used if passed through a suitable compensating delay.

3. Significant differences between the two picture signals are detected. It is not realistic to demand absolute equality because the MPEG specification allows for small differences, for example in the DCT specification, and indeed says nothing about post-filtering. Special attention must be paid to what is known about the two decoders in this respect when formulating a criterion for significant differences.

4. The input Information Bus and picture signal are delayed to match the output difference detector. The value of each parameter that occurs when differences are detected is fed to a histogram unit. If certain parameter values or ranges of values are causing problems in the test decoder, this should become apparent as the histograms are built up. Note that there will be a certain amount of "noise" in the histograms because macroblocks that are predicted from erroneous data will also be erroneous.

Figure 10:
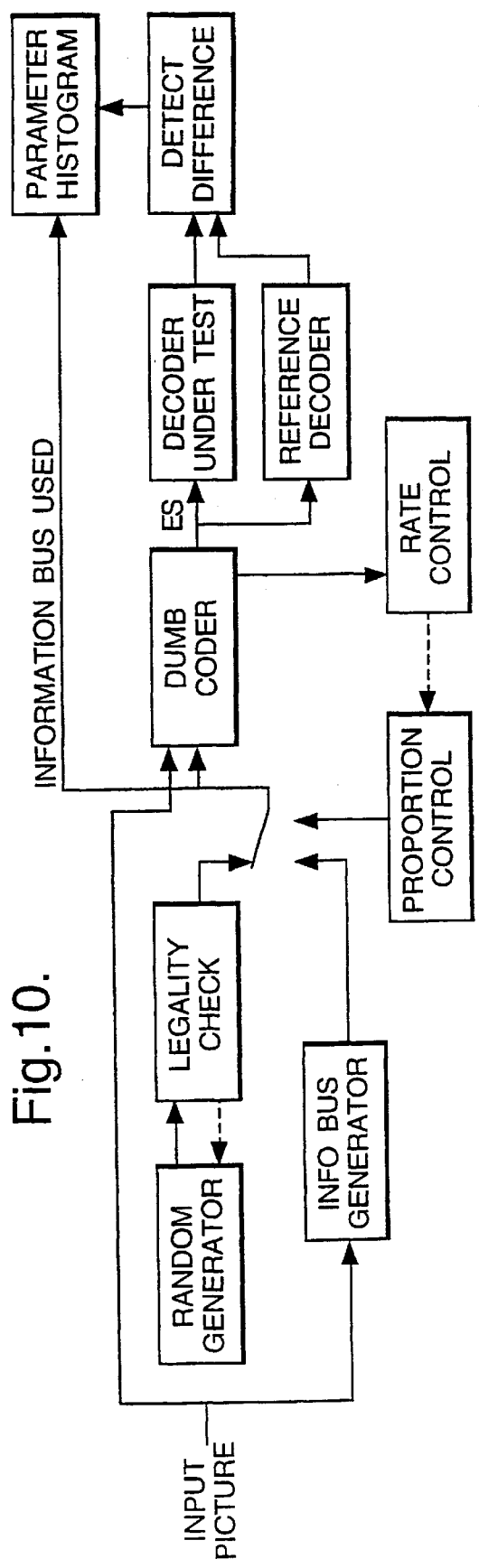
FIG. 10 is a diagram illustrating the incorporation of the analysis results to form a complete testing system according to the invention.

FIG. 10 shows how the analysis of results is incorporated to form the complete testing system.

The system described here provides an important addition to the range of methods that can be used to test decoders. It is likely to provide the most stringent test possible of the vast majority of coding parameters. However, because of the complex nature of compression systems, there may be some aspects that are not adequately tested by this system. Possible examples are behaviour with very low buffer occupancies and when stuffing is involved, and small but systematic prediction drift. It is therefore suggested that the prior art methods are used in conjunction with the invention to provide the most reliable test possible.

What is claimed is:

1. Apparatus for testing a compression decoder, comprising: a compression encoder having a picture input for receiving picture material and a coding decision input for receiving coding decisions from a set of legal coding decisions, the compression encoder being adapted to encode picture material utilising the received coding decisions; a generator for generating random coding decisions from the legal set, and a playback device for communicating encoded picture material from said encoder to a decoder under test.

2. Apparatus according to claim 1, wherein the generator comprises a sub-generator for generating random coding decisions and a substitutor for replacing illegal coding decisions with legal coding decisions.

3. Apparatus according to claim 1, wherein the generator is adapted to generate pseudo-random coding decisions from the legal set.

4. Apparatus according to claim 1, wherein the generator is adapted to generate the random coding decisions for selected portions of picture material.

5. Apparatus according to claim 4, wherein the generator is further adapted to generate the random coding decisions for selected portions of discrete pictures.

6. Apparatus according to claim 4, wherein the generator is adapted to select at random the portions of input picture material for which to generate the random coding decisions.

7. Apparatus according to claim 1, further comprising a conveyor for delivering random picture material to said picture input.

8. Apparatus for testing a compression decoder, comprising: a compression encoder having a picture input for receiving picture material and a coding decision input for receiving coding decisions from a set of legal coding decisions, the compression encoder being adapted to encode picture material utilising the received coding decisions; a generator for generating random coding decisions from the legal set; a playback device for communicating encoded picture material from said encoder to a decoder under test; and a reference decoder and a comparator for comparing an output of the reference decoder with an output of the decoder under test, and wherein the playback device is adapted to communicate encoded picture material from the encoder to the reference decoder.

9. Apparatus according to claim 8, comprising a communicator for communicating the coding decisions from the generator to the comparator, and wherein the comparator is adapted to monitor differences between the output of the reference decoder and the output of the decoder under test and register the coding decisions corresponding to the differences.

10. A method of testing a compression decoder, comprising receiving picture material and coding decisions from a set of legal coding decisions, generating random coding decisions from the legal set, using the random coding decisions to encode the picture material, and communicating encoded picture material to a decoder under test.

* * * * *